United States Patent
Prata et al.

(10) Patent No.: US 10,063,794 B2
(45) Date of Patent: Aug. 28, 2018

(54) SYSTEM AND METHOD FOR DETECTING ADVERSE ATMOSPHERIC CONDITIONS AHEAD OF AN AIRCRAFT

(75) Inventors: Alfredo Jose Prata, Leirsund (NO); Cirilo Bernardo, Giralang (AU)

(73) Assignee: Nicarnica Aviation AS, Lysaker (NO)

( * ) Notice: Subject to any disclaimer, the term of this patent is extended or adjusted under 35 U.S.C. 154(b) by 773 days.

(21) Appl. No.: 13/334,908

(22) Filed: Dec. 22, 2011

(65) Prior Publication Data

US 2012/0191350 A1    Jul. 26, 2012

Related U.S. Application Data

(63) Continuation-in-part of application No. PCT/EP2011/056805, filed on Apr. 28, 2011.

(Continued)

(30) Foreign Application Priority Data

Apr. 29, 2010   (NO) .................................. 20100625

(51) Int. Cl.
  *G01W 1/00*  (2006.01)
  *H04N 5/33*  (2006.01)
  (Continued)

(52) U.S. Cl.
  CPC .............. *H04N 5/33* (2013.01); *G01S 3/781* (2013.01); *G01S 19/53* (2013.01); *H04N 5/247* (2013.01)

(58) Field of Classification Search
  CPC ........... G01J 5/60; G01J 5/0014; G01S 3/781; G01S 3/787; G01S 11/12; G01S 17/95;
  (Continued)

(56) References Cited

U.S. PATENT DOCUMENTS 3,931,462 A   1/1976  Exton
4,363,967 A  12/1982  Efkeman
(Continued)

FOREIGN PATENT DOCUMENTS

EP    0368580 A2   5/1990
EP    0369580      5/1990
(Continued)

OTHER PUBLICATIONS

T. Yu, W. I.Rose and A. J. Prata, "Atmospheric correction for satellite-based volcanic ash mapping and retrievals using "split window" IR data from GOES and AVHRR", Journal of Geophysical Research, vol. 107, No. D16, 2002.*
(Continued)

*Primary Examiner* — Elias Desta
(74) *Attorney, Agent, or Firm* — Banner & Witcoff, Ltd.

(57) ABSTRACT

The system has multiple, infrared cameras 8 adjusted to spatially detect infrared radiance in different bands of infrared light, and connected to an image processing computer that processes and combines the images, and generates video display signals for producing a video display which indicates the position of the adverse atmospheric conditions relative to the aircraft. Each of the cameras is provided with a respective filter adjusted to filter infrared light with a bandwidth corresponding to infrared bandwidth characteristics of an adverse atmospheric condition from a set of adverse atmospheric conditions. The image processing computer is adapted to identify adverse atmospheric conditions, based on threshold conditions and using the detected infrared radiance, data from a look-up table and measured parameters including information on the position and/or attitude of the aircraft. The image processing computer is further adapted to display the identified adverse atmospheric conditions as a spatial image on a display.

27 Claims, 4 Drawing Sheets

Related U.S. Application Data

(60) Provisional application No. 61/329,353, filed on Apr. 29, 2010.

(51) Int. Cl.
*G01S 3/781* (2006.01)
*G01S 19/53* (2010.01)
*H04N 5/247* (2006.01)

(58) Field of Classification Search
CPC ............ H04N 5/33; H04N 5/332; H04N 7/18; G01M 3/38; G01N 21/314; G01N 21/33; G01N 21/35; G01N 21/3504; G01N 33/0042; G01N 33/0047; G01P 3/36
See application file for complete search history.

(56) References Cited

U.S. PATENT DOCUMENTS

| | | | |
|---|---|---|---|
| 4,390,785 A | 6/1983 | Faulhaber et al. | |
| 4,965,572 A | 10/1990 | Adamson | |
| 4,965,573 A * | 10/1990 | Gallagher | G01P 5/10 244/181 |
| 5,140,416 A | 8/1992 | Tinkler | |
| 5,602,543 A | 2/1997 | Prata | |
| 5,654,700 A * | 8/1997 | Prata | G01J 5/60 250/339.14 |
| 6,154,252 A | 11/2000 | Tanaka | |
| 6,756,592 B1 | 6/2004 | Smith et al. | |
| 7,471,995 B1 | 12/2008 | Robinson | |
| 8,135,500 B1 * | 3/2012 | Robinson | 701/3 |

FOREIGN PATENT DOCUMENTS

| | | |
|---|---|---|
| JP | H02210216 A | 8/1990 |
| JP | H05506628 A | 9/1993 |
| JP | 2004341936 A | 12/2004 |
| JP | 2007502403 A | 2/2007 |
| JP | 2008145133 A | 6/2008 |
| WO | 2005031321 | 4/2005 |
| WO | 2005031323 | 4/2005 |
| WO | 2005068977 | 7/2005 |
| WO | 2011135060 | 11/2011 |

OTHER PUBLICATIONS

International Search Report dated Dec. 18, 2012 for PCT/EP2011/056805, 4 pages.
International Search Report for PCT/EP2011/056805 dated Aug. 24, 2011, 4 pages.
Alfred J. Prata et al., "Detection and discrimination of volcanic ash clouds by infrared radiometry—1. Theory", US Geology Survey Bulletin 2047, Jan. 1, 1994, 305-311, XP055299344.
Alfred J. Prata et al., "Detection and discrimination of volcanic ash clouds by infrared radiometry—1. Expeimental", US Geology Survey Bulletin 2047, Jan. 1, 1994, 313-317, XP055299345.
Alfred J. Prata, "Satellite detection of hazardous volcanic clouds and the risk to global air traffic", Jun. 13, 2008, 1-22, XP055299350, DOI: 10.1007/si 1069-008-9273-z.
Dr. Fred Prata et al., "Ground-based imaging cameras for volcanic gas and particle measurements", Dec. 2008.

* cited by examiner

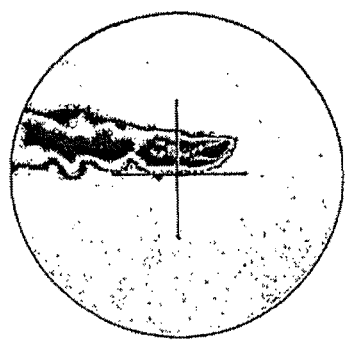
FIG. 4A
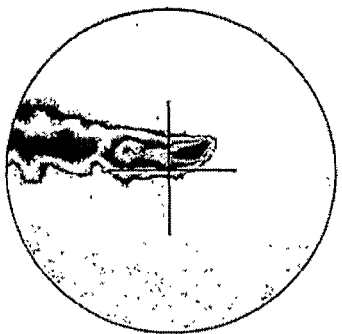
FIG. 4B
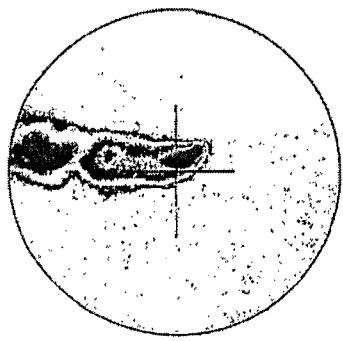
FIG. 4C
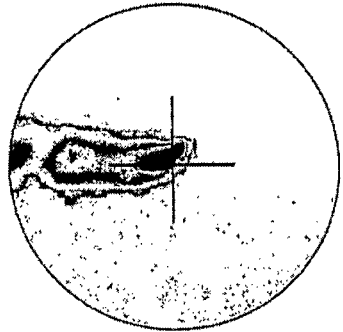
FIG. 4D
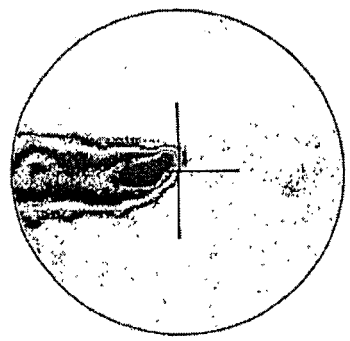
FIG. 4E
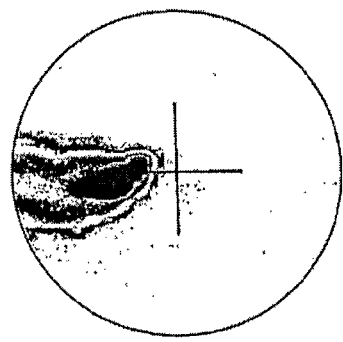
FIG. 4F
FIG. 4

SYSTEM AND METHOD FOR DETECTING ADVERSE ATMOSPHERIC CONDITIONS AHEAD OF AN AIRCRAFT

This is a continuation-in-part of International Application No. PCT/EP2011/056805 with an international filing date of Apr. 28, 2011, and claims priority thereto and the benefit thereof, and also claims priority to and the benefit of U.S. Provisional Patent Application No. 61/329,353, filed Apr. 29, 2010 and Norwegian Patent Application No. 20100625 filed Apr. 29, 2010 all of which are fully incorporated by reference herein by their entirety.

FIELD

The disclosure herein relates to an apparatus and method for detecting adverse atmospheric conditions ahead of an aircraft. Such conditions may include volcanic clouds and so the apparatus may, for example, detect sulphur dioxide and particles such as volcanic ash, wind-blown dust and ice particles. The disclosure herein also relates to a method of producing such an apparatus or essential components thereof.

BACKGROUND

Modern civil aircraft typically cruise at between 30,000 and 40,000 feet, which places them above most weather systems, except for towering cumulonimbus clouds and their associated electrical storms. As these can present a hazard, most airliners are equipped with weather radar that can detect them and enable the pilot to take avoiding action. However, there remain a number of adverse atmospheric conditions that are desirable to detect for which suitable avionic systems are not presently available. These include volcanic ash, toxic gases such as sulphur dioxide gas, wind-blown dust and ice particles.

Volcanic clouds contain silicate ash and gases that are hazardous to aviation. Several encounters between jet aircraft and volcanic ash have resulted in significant damage due to ingestion of ash into the hot parts of the engine, subsequent melting and fusing onto the turbine blades. Ash can also block the pitot static tubes and affect sensitive aircraft instruments, as well as abrade the leading edges of parts of the airframe structure.

Volcanic gases, principally sulphur dioxide ($SO_2$), whilst less dangerous to aircraft than volcanic ash, do pose a hazard in themselves. In addition, their presence can be used as an indicator of volcanic ash as these substances are often co-located and are transported together by atmospheric winds. $SO_2$ clouds from volcanoes will react with water vapour in the atmosphere to produce sulphuric acid which can damage aircraft.

Another important gas in volcanic clouds is water vapour ($H_2O$ gas). Water vapour occurs in copious amounts in volcanic clouds, either through entrainment of ambient air or from water from the volcanic source (e.g. sea water is a common source for volcanoes on islands or in coastal regions). Once in the atmosphere, the water vapour can condense on ash which act as nuclei, rapidly forming ice with a much smaller radius than ice in normal meteorological clouds. These abundant, small-sized ice particles are hazardous to aircraft because the rapid melting of the ice when in contact with the hot engines releases the ash nuclei which then fuse onto the turbine blades, affecting the engine performance and potentially causing the engine to stop.

Damage to aircraft resulting from encounters with volcanic clouds can be counted in the millions of dollars. Most serious aircraft encounters with ash clouds have been at cruise altitudes, but there is also a hazard to aircraft at airports affected by volcanic ash. These airports are usually close to an active volcano but they can also be at some distance from the source of the eruption due to atmospheric transport that brings ash into the region.

The cost of ash hazards to airport operations is not known, but must be significant if the costs include those due to delays to landings and take-offs as well as re-routing costs incurred by airline operators. The April 2010 eruption of Eyjafjallajoekull in Iceland is estimated to have cost the airline industry approximately US$2 billion.

Although there are currently no regulatory requirements for airport operators to provide warnings of ash hazards, warnings are issued based on information from volcano observatories, meteorological advisories and, in some cases, radar observations of eruption columns. Radar information is generally only reliable at the start of an eruption when the ash cloud is thick and usually such information is only available at airports in close proximity to an erupting volcano. For airports distant from the source of ash there are few direct observations available. Some observations come from satellite systems and other sources of information come from trajectory forecasts based on wind data and cloud height information. Much of this information is sporadic and untimely and there is a need for better detection systems.

Whilst volcanic clouds are the best known example (apart from thunder clouds) of an adverse atmospheric condition, there are other such hazards. For example, other non-ash particles can also under the right conditions initiate ice particle formation when they form nuclei around which water freezes. Ice crystals may accrete within turbine engines and are believed to be the cause of a number of power loss events. In addition, there is the possibility of toxic or otherwise dangerous gasses being emitted from industrial sources.

Jet aircraft at cruise altitudes (i.e. above 15,000 feet), travel rapidly (>500 km hr$^{-1}$) and currently do not have a means for detecting volcanic cloud hazards ahead. Because of the high speed, a suitable detection method must be able to gather information rapidly and provide an automated alert and be capable of distinguishing volcanic substances from other substances in the atmosphere (e.g. meteorological clouds of water and ice).

U.S. Pat. No. 5,654,700 proposes a volcanic cloud detection system which displays the position of a volcanic cloud relative to the aircraft's position and thereby enables the aircraft to route around the cloud. The system operates by comparing the absolute and relative values of brightness temperatures detected at a number of specific infra-red wavelengths to certain threshold values. However, there is no disclosure about how these threshold values are determined, except that they are calculated using a microprocessor and depend on the altitude and attitude of the aircraft.

SUMMARY

In one exemplary embodiment, there is provided a method of detecting an adverse condition in the atmosphere ahead of an aircraft in flight, comprising:—
a) creating and/or utilizing a model of the atmosphere based on simulation of infrared radiative transfer characteristics of a clear atmosphere combined with infrared radiative transfer characteristics of the adverse condition;

b) using an infrared sensor mounted on the aircraft, determining a value corresponding to the brightness temperature at a given frequency as viewed ahead of the aircraft;

c) based on the aircraft's altitude and attitude, using the model to determine whether the brightness temperature value determined in step (b) is indicative of the atmosphere ahead of the aircraft having the adverse condition; and d) where the adverse condition is indicated in step (c), providing an alert to the presence of the adverse condition.

It will be appreciated that, as in U.S. Pat. No. 5,654,700, the brightness temperature value determined in step (b) will typically be at a frequency that is characteristic of the adverse condition. Likewise, brightness temperature values may be determined at a plurality of frequencies corresponding to a single adverse condition or to a plurality of adverse conditions. For example, they may relate to different substances present in the atmosphere. These may relate, as discussed above, to a common underlying cause, such as a volcanic eruption.

Thus, in one exemplary embodiment, the system processes brightness temperature values using data obtained from a radiative transfer model of the atmosphere. Such a model can be created that provides accurate data corresponding to views from an aircraft at any altitude and taking into account its attitude (e.g. pitched up or down). This is important because it is known that the background temperature varies significantly depending on whether the aircraft is directed towards space or the earth for example. Also, such a model can be created to cover a range of infrared frequencies and so the method is readily applicable to the detection and analysis of brightness temperatures at a number of frequencies. Likewise, it is applicable to the detection of a number of adverse conditions, or at a plurality of frequencies which are collectively indicative of a given adverse condition. For example, as is known from U.S. Pat. No. 5,654,700, a pair of brightness temperatures relating to different frequencies may be compared and an indication of an adverse condition provided if they differ by more than a given amount.

The radiative transfer model may be highly detailed and therefore large and therefore it will often be impracticable to store the model itself in any practical apparatus. Furthermore, the model itself will contain far more data than is required to perform step (c). Therefore, the data derived from the model can be stored in memory and said data is used in the determination of step (b).

In particular, the data can be stored as a look-up table, which may, for example, be indexed by aircraft altitude and attitude. Where a plurality of frequencies are used, it will also be indexed by frequency.

Although it is possible to store brightness temperatures corresponding to adverse conditions and to compare them to measured brightness temperatures, in many cases it will be more convenient to store threshold values. The use of thresholds is also useful because, as in U.S. Pat. No. 5,654,700, some adverse conditions are identified based upon functions of one or more brightness temperatures. Thus, the data comprises threshold values indicative of the presence of the adverse condition and in particular an alert is provided if a function of the brightness temperature exceeds the threshold value obtained from the look-up table for the altitude and attitude of the aircraft and for the frequency(ies) at which the brightness temperature(s) were determined. The threshold values can also be determined to allow for statistical variation and error so that a balance is struck between sensitivity and false alarms.

As an example, the function may comprise a difference between the brightness temperature at a first frequency and the brightness temperature at a second frequency. The magnitude of the threshold value may then indicate a minimum difference between the measured brightness temperatures that is regarded as indicating, to an appropriate level of confidence, the presence of an adverse condition.

Note that the term "brightness temperature value" is used to indicate a quantity that corresponds, at least substantially, in a known manner, to the actual brightness temperature. Needless to say, units of measurement are arbitrary. Furthermore, brightness temperature values need not have a linear relation to brightness temperature.

Another exemplary embodiment concerns a method of manufacturing an apparatus for the detection of an adverse condition ahead of an aircraft in flight, the method comprising:

(i) providing an electronic data processor including a microprocessor and memory;

(ii) creating a model of the atmosphere based on simulation of infrared radiative transfer characteristics of a clear atmosphere combined with infrared radiative transfer characteristics of the adverse condition;

(iii) storing data derived from the model in the memory;

(iv) providing input means for communicating to the data processor data corresponding to the brightness temperature detected by an infrared sensor, aircraft altitude and aircraft attitude.

(v) providing software capable of using the data from steps (iii) and (iv) to determine whether an adverse atmospheric condition exists ahead of an aircraft.

In particular, the data derived from the model may be stored in a look-up table, as discussed above. The apparatus can be arranged to operate according to the preferred features set out above. Another exemplary embodiment concerns an apparatus provided by this method of manufacture, and in particular to one having the preferred methods of operation.

The infrared sensors can provide spatially resolved data so that an output can be provided in the form of an image. Thus, the method as set out above may be applied to each pixel in the image. Consequently, one exemplary embodiment may provide not just an indication that an adverse condition exists ahead of the aircraft, but a display indicating its relative position to the aircraft's flight path.

The sensors can be collocated uncooled microbolometer cameras. In addition, the data processor can be arranged to determine brightness temperatures from the detected infrared radiance.

Such an apparatus is advantageous in that it detects adverse atmospheric conditions, in particular caused by volcanoes, and visualizes them for the crew of the aircraft. The embodiments disclosed herein are particularly useful for detecting volcanic clouds. For example, one exemplary embodiment can be arranged to enable the rapid detection of volcanic substances ahead of a jet aircraft at cruise altitudes and the simultaneous detection and discrimination of volcanic ash, $SO_2$ gas and ice-coated ash particles. This exemplary embodiment provides algorithms and processes for converting raw camera data to identify ash, $SO_2$ gas and ice coated ash.

The system may also include one or more external blackened shutters against which the infrared sensors are pre-calibrated for providing in-flight calibration values.

The system provides a statistical alert based on analysis of images determined to show an adverse condition of ash, sulphur dioxide or ice-coated ash. The statistical alert uses spatial and temporal information and can be tuned according to in-flight tests to reduce false-alarms and ensure robustness.

As well as the system being arranged to detect at least the three volcanic substances (ash, $SO_2$ and ash coated ice particles) in the air ahead of the aircraft by a remote method, and in addition it is capable of discriminating these from other meteorological clouds of water droplets and ice.

Another exemplary embodiment also more generally provides a system for detecting adverse atmospheric conditions ahead of an aircraft, including a plurality of infrared cameras mounted on the aircraft, wherein: the infrared cameras are adjusted to spatially detect infrared radiance in different bands of infrared light; each camera is connected to an image processing computer that processes and combines the images, wherein each of the cameras is provided with a respective filter adjusted to filter infrared light with a bandwidth corresponding to infrared bandwidth characteristics of an adverse atmospheric condition from a set of adverse atmospheric conditions; and the image processing computer is adapted to identify and display adverse atmospheric conditions, said identifying being based on threshold conditions and using the detected infrared radiance and measured parameters including information on the position and/or attitude of the aircraft.

Another exemplary embodiment provides a system for detecting adverse atmospheric conditions ahead of an aircraft, including a plurality of infrared cameras mounted on the aircraft, wherein: the infrared cameras are adjusted to spatially detect infrared radiance in different bands of infrared light, each camera is connected to an image processing computer that processes and combines the images, and generates video display signals for producing a video display which indicates the position of the adverse atmospheric conditions relative to the aircraft; each of the cameras is provided with a respective filter adjusted to filter infrared light with a bandwidth corresponding to infrared bandwidth characteristics of an adverse atmospheric condition from a set of adverse atmospheric conditions; the image processing computer is adapted to identify adverse atmospheric conditions, said identifying being based on threshold conditions and using the detected infrared radiance, data from a look-up table and measured parameters including information on the position and/or attitude of the aircraft; and the image processing computer is further adapted to display the identified adverse atmospheric conditions as a spatial image on a display.

Another embodiment provides a method for detecting adverse atmospheric conditions ahead of an aircraft and displaying said adverse atmospheric conditions, comprising spatially detecting infrared radiance in different bands of infrared light using a plurality of infrared cameras; and, for each camera: i) Filtering the infrared radiation with a filter adjusted to filter infrared light with a bandwidth corresponding to infrared bandwidth characteristics of an adverse atmospheric condition in a set of adverse atmospheric conditions; ii) identifying likely occurrences of adverse atmospheric conditions based on threshold conditions and using the detected infrared radiance, data from a look-up table and measured parameters including information on the position and/or attitude of the aircraft; and iii) processing the identified likely occurrences of adverse atmospheric conditions to create a spatial image.

In one embodiment, the method further comprises the step of iv) combining the image with images from other cameras and information on the aircraft flight path.

The adverse atmospheric conditions can include volcanic ash, ice coated ash, water vapour and sulphur dioxide. The measured parameters can include pitch angle and ambient temperature.

In a further aspect, this embodiment provides a system for detecting volcanic clouds ahead of an aircraft, including one or more infrared cameras mounted on the aircraft, the infrared cameras are adjusted to spatially detect infrared radiance in different bands of infrared light, each camera is connected to an image processing computer that process and combines the images, combining them with flight path information from the aircraft and generates video display signals for producing a video display which indicates the position of the adverse conditions relative to the aircraft; characterized in that each of the cameras is provided with a respective filter adjusted to filter infrared light with a bandwidth corresponding to infrared bandwidth characteristics of one of the volcanic species in a set of volcanic species, and that the image processing computer is adapted to identify and display species as a spatial image on a display by means of threshold look-up tables for the respective species mapping thresholds for the infrared radiance, above which species are likely to occur, with measured parameters.

In another exemplary embodiment, a method for detecting a volcanic cloud ahead of an aircraft and displaying said cloud, processing information from one or more infrared cameras spatially detecting infrared radiance in different bands of infrared light, combining the information with flight path information from the aircraft characterized in the steps of for each camera: i) Filtering the infrared radiation with a filter adjusted to filter infrared light with a bandwidth corresponding to infrared bandwidth characteristics of one of the volcanic species in a set of volcanic species; ii) identifying likely occurrences of species by looking up detected infrared radiance values in a threshold look-up table mapping thresholds for the infrared radiance, above which species are likely to occur, with measured parameters; iii) processing the identified likely occurrences of species to create a spatial image.

BRIEF DESCRIPTION OF THE DRAWINGS

Exemplary embodiments will now be described, by way of example only, with reference to the accompanying drawings, in which:—

FIGS. 4(A) to (F) shows an ash cloud on the display of the embodiment;

DETAILED DESCRIPTION OF CERTAIN EXEMPLARY EMBODIMENTS

Figure 1:
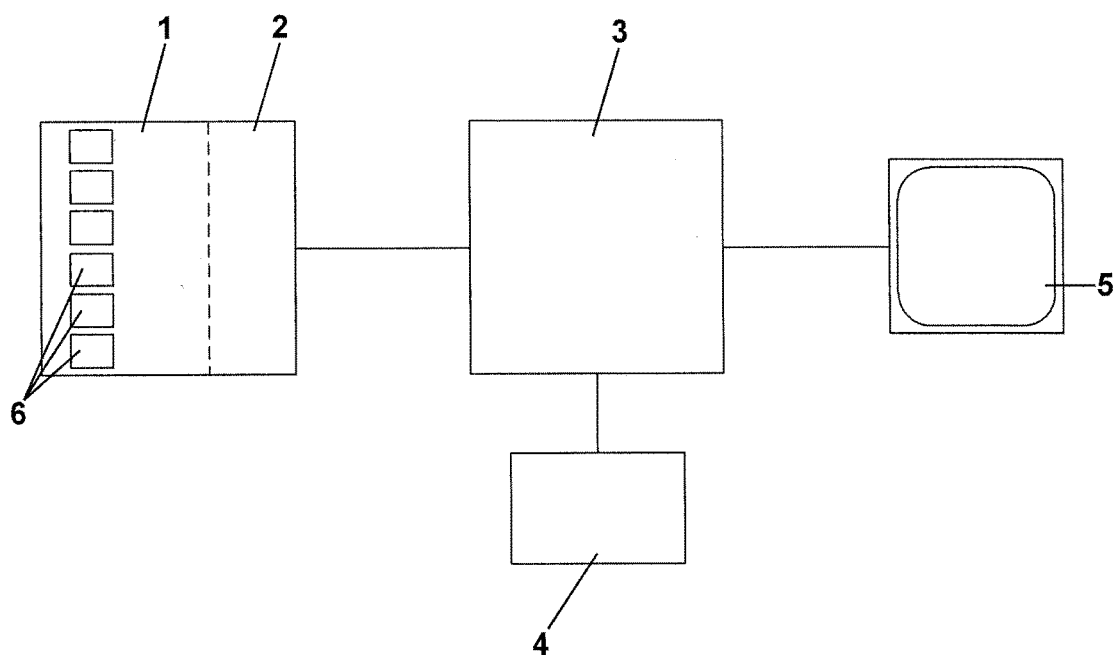
FIG. 1 is a schematic diagram of a volcanic cloud detector according to an exemplary embodiment.

As shown in FIG. 1, the volcanic cloud detection apparatus of the embodiment comprises a detector array 1 and its associated electronics 2, a data processing unit 3, memory 4 and a display unit 5 that provides output data to an aircraft pilot. Computer instructions for implementing any of the methods described herein are capable of being stored on the memory 4. These instructions can be executed by the processing unit 3.

Figure 2:
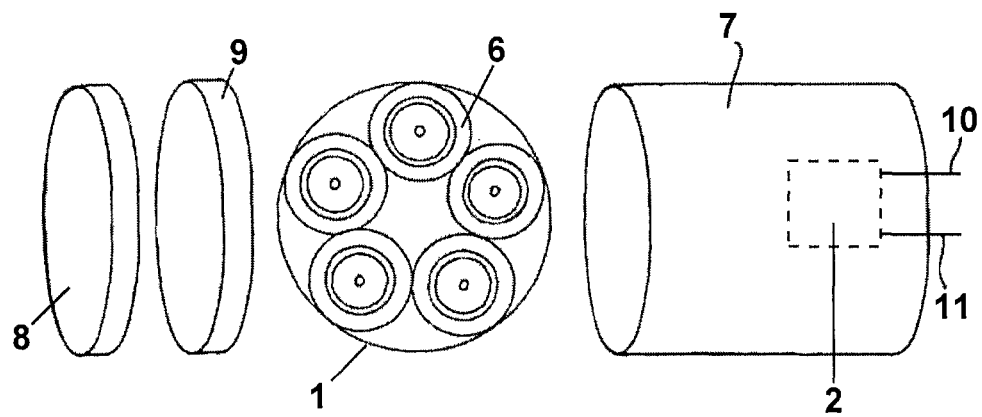
FIG. 2 is a schematic diagram illustrating the detector array of FIG. 1 mounted.

As may be seen from FIG. 2, detector array 1 comprises five infrared detectors 6, which are infrared sensitive cameras and are located adjacent and parallel to each other within a housing 7. At one end of the housing, a mechanically driven protective shutter 8 is provided, which is closed when the apparatus is not in use. This is blackened and is provided with a heater (not shown) for use in calibration of the camera, as will be explained below. The shutter also serves the purpose of providing protection against debris and dirt directed toward the camera during take-off and landing, when the system is deactivated. A germanium glass window 9 is located behind the shutter to provide protection from debris while in viewing mode. The cameras 6 are located behind the germanium window, with their signal 10 and power 11 lines extending from the back of the housing 7. The housing 7 also contains the camera electronics and software unit 2 including a frame grabber and related computer hardware.

Figure 3:
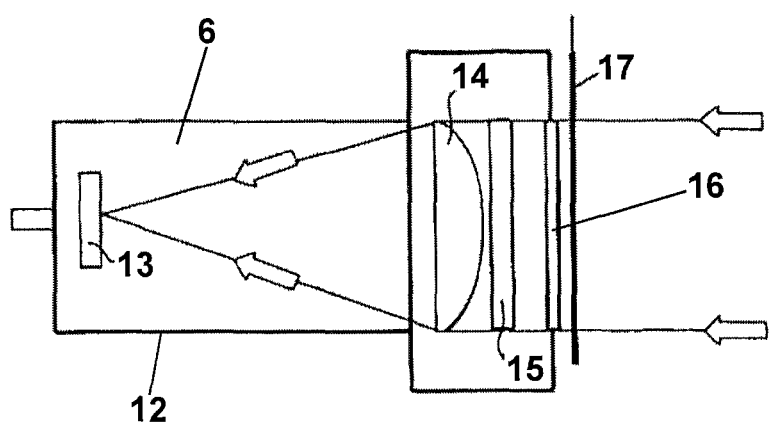
FIG. 3 is a schematic diagram of an infrared camera that forms part of the detector array of the embodiment.

The cameras are wide-field-of-view, rapid sampling, imaging, uncooled microbolometer cameras as shown in FIG. 3. Each of these detects a different narrow band (0.5-1.0 μm) of infrared radiation within the region of 6-13 μm. These enable the detection of ash, water vapour, $SO_2$ gas and ice coated ash.

Each camera 6 comprises a housing 12 which contains detector 13, lens 14, and narrow band filter 15. The housing is provided with an infrared transmissive germanium glass window 16 and the window is covered by a camera shutter 17. Infrared radiation from ahead of the aircraft enters the filter 15, is focused through the camera lens 14 and falls on the detector array 13.

In a microbolometer, infrared radiation strikes the detector 13, heating it, and thus changing its electrical resistance. This resistance change is measured and processed into temperatures (as described below) which can be used to create an image. Unlike other types of infrared detecting equipment, microbolometers do not require cooling.

The detector 13 has 640×512 pixels and has a noise equivalent temperature difference of 50 mK (or better) at 300 K in the 10-12 μm region, and provides sampling rates up to 60 Hz. It is sensitive to infrared radiation within the region 6-13 μm.

Narrowband filters 15 are placed over the lens 14 of each camera 6 to restrict spectral content of the radiation that reaches detector 13 to a narrow band. Each camera in the array is sensitive to a different band. The cameras share the same field of view ahead of the aircraft and therefore, in principle, multiple, simultaneous narrowband infrared images can be acquired by the array 1 in real-time.

To protect the filter and lens while the system is viewing ahead of the aircraft, an IR transparent window 16 (e.g. Germanium glass) is attached between the shutter and filter. The shutter is temperature controlled and blackened on the side facing the optics.

A detector electronics module 2 is provided within the housing 7 of the detector array. This contains the components necessary to pre-process the data output from each detector 13.

The cameras 6 are pre-calibrated prior to installation on the aircraft so that each camera registers the same digital signal when exposed to the same amount of infrared radiation. This can be achieved by pointing each camera, without its filter, at a known source of infrared radiation having a known constant temperature and recording the digital signal from each pixel of each camera. A calibration look-up table is then created in non-volatile memory within module 2 by varying the source temperature through the range 210 to 300 K, in steps of 10 K (for example) for each camera, giving a table of 640×512×10×2 values, assuming a linear calibration. Thus, the calibration look-up table enables a radiance value to be provided for a given digital output from each pixel. (Radiance is assumed to have a linear relationship to the signal counts). This process is repeated for each narrowband filter used. Once on board the aircraft, intermittent re-calibrations are performed using the blackened shutter 8. Optionally, a second shutter could be used to provide a second calibration point in a linear calibration equation. This is heated and placed in front of the filter. The digital counts corresponding to the known (controlled) temperature of the shutter are then recorded.

The calibrated radiance data for each pixel of all five cameras is transmitted from detector electronics module 2 to processing unit 3. This comprises a conventional computer architecture having a microprocessor and memory 4, which includes a look-up table. The microprocessor runs software that implements a number of algorithms which, using data from the look-up table, determine whether the outputs from the cameras 6 are indicative of one or more volcanic cloud species, or another hazardous condition. When a hazardous condition is detected, the processing unit activates display 5. The operation of the algorithms and the resulting output display will now be described in more detail.

The system is de-activated until the aircraft reaches cruise altitude. In deactivated mode the shutter is closed. Before activation a pre-calibration cycle for the system (all five cameras) is conducted. The shutter is then opened and the system begins to collect images.

Commercial cameras can sample as fast as 60 Hz and this is the preferred sampling rate (or higher). However, some export restrictions apply to some cameras and this means lower sampling rates may apply. In the described embodiment, a sampling rate of 8 Hz is used, as at this frequency there are no export restrictions. (The basic principle is unchanged when using a higher sampling frequency).

Each camera provides eight images of size N columns by M lines (where N=640 and M=512) every second. The processor unit first converts the calibrated radiance values obtained from the camera electronics to a brightness temperature ($BT_{i,j,k}$), where k represents the camera number and k=1, 2, 3, 4 or 5, in the current system, and i and j are column and line numbers, respectively (i≤N, j≤M). The brightness temperature is determined from:

$$R_{i,j,k} = \frac{c_1 v_k^3}{e^{c_2 v_k / BT_{i,j,k}} - 1}$$

Where:
$R_{i,j,k}$ is the radiance at pixel i, line j and filter k
$v_k$ is the central wave number for camera filter k
$BT_{i,j,k}$ is the brightness temperature
$c_1$ and $c_2$ are the Einstein radiation constants
Camera images may be averaged in order to reduce noise and improve the signal-to-noise ratio of the system.

For illustration purposes only, we shall concentrate on one image pixel and assume that all other pixels can be treated in the same manner, noting that the calibration look-up table is different for every pixel. The data for one pixel consists of the measurements: BT1, BT2, BT3, BT4 and BT5, where these represent brightness temperatures from each of the five cameras (e.g. BT1 is the brightness temperature for that pixel in camera 1 which has filter 1).

The system is linked into the aircraft instrument data stream so that GPS coordinates, altitude (z), longitude (l), latitude (q), heading (h), direction (d), roll (r), yaw (y), pitch (x), time (t), speed over the ground (v), wind speed (w) and local ambient temperature (Ta) are available at a sampling rate of at least 1 s$^{-1}$ and preferably faster.

The five values of brightness temperature are compared to each other and/or to the ambient temperature using a series of algorithms. Each algorithm uses one or more predetermined threshold values stored in a look-up table in memory 4. These values are determined from a model atmosphere that is based on radiative transfer calculations, as will be described further below. Note that all temperatures are in kelvins.

In the embodiment, the system uses filters at the following central wavenumbers (in cm$^{-1}$):

TABLE 1

Filter specifications for an exemplary embodiment.

| Filter | Central wave number (cm$^{-1}$) | Bandwidth (cm$^{-1}$) | NEDT (mK) | Purpose |
|---|---|---|---|---|
| 1 | 1410 | 100 | 200 | H2O |
| 2 | 1363 | 100 | 200 | SO2 |
| 3 | 1155 | 100 | 200 | SO2/ash |
| 4 | 929 | 60 | 100 | Ash/ice |
| 5 | 830 | 60 | 100 | Ash/ice |

Ash Detection Algorithm

A pixel is declared to be ash if both of the following conditions are met at each instance:

$$DT1_{Ash}=(BT4-BT5)/BT4>T1_{Ash}(Ta,r,y,x)/Ta \quad (1)$$

$$DT2_{Ash}=(BT3-BT5)/BT3>T2_{Ash}(Ta,r,y,x)/Ta \quad (2)$$

Where $T1_{Ash}$ and $T2_{Ash}$ are threshold values of temperature difference that are both a function of a set of parameters, including ambient temperature (Ta) and realistic aircraft roll, pitch and yaw values. Note that $DT1_{Ash}$ and $DT2_{Ash}$ are non-dimensional quantities and are strictly indices. Ta may vary across the image—i.e. it need not be the same for all pixels. An alert is sounded if a sequence of 8 consecutive occurrences of conditions (1) and (2) happen for a pre-defined fraction of the total image. A value of 5% of the total number of pixels in the difference image is used, but this can be tuned as necessary—a lower value set if the aircraft is operating in airspace declared, or likely to be influenced by volcanic ash; a higher value in unaffected areas.

H$_2$O Detection Algorithm

A pixel is declared to be water vapour affected if the following conditions are met at each instance:

$$DT_{wv}=BT1-Ta>T_{wv}(Ta,r,y,x) \quad (3)$$

Where $T_{wv}$ is a threshold value of temperature difference that is a function of a set of parameters, including ambient temperature (Ta), and realistic aircraft roll, pitch and yaw values.

No alert is sounded, but $T_{wv}$ is used with the ice algorithm if that alert is sounded.

Ice-Coated Ash (ICA) Detection Algorithm

A pixel is declared to be ICA if the following conditions are met at each instance, $$DT_{ICA}=(BT4-BT5)/BT4<T_{ICA}(Ta,r,y,x)/Ta \quad (4)$$

Where $T_{ICA}$ is a threshold value of temperature difference that is a function of a set of parameters, including ambient temperature (Ta), and realistic aircraft roll, pitch and yaw values.

An alert is sounded if a sequence of 8 consecutive occurrences of condition (4) happen for a pre-defined fraction of the total image. A value of 5% of the total number of pixels in the difference image is used, but this can be tuned as necessary—a lower value set if the aircraft is operating in airspace declared or likely to be influenced by volcanic ash; a higher value in unaffected areas. When the alert is sounded condition (3) is checked and if this condition is met, the pixel is confirmed to be ICA. The use of the water vapour condition is entirely novel and reduces the false alarm rate for detecting hazardous small-sized ice-coated ash particles.

SO$_2$ Detection Algorithm

A pixel is declared to be SO$_2$ if the following conditions are met at each instance, $$DT1_{SO2}=(BT1-BT2)/BT1<T1_{SO2}(Ta,r,y,x)/Ta \quad (5)$$

$$DT2_{SO2}=(BT3-BT5)/BT3<T2_{SO2}(Ta,r,y,x)/Ta \quad (6)$$

Where $T1_{SO2}$ and $T2_{SO2}$ are threshold values of temperature that are a function of a set of parameters including ambient temperature (Ta), and realistic aircraft roll, pitch and yaw values.

An alert is sounded if a sequence of 8 consecutive occurrences of conditions (5) and (6) happen for a pre-defined fraction of the total image. A value of 5% of the total number of pixels in the difference image is used, but this can be tuned as necessary—a lower value set if the aircraft is operating in airspace declared to be or likely to be influenced by volcanic ash; a higher value is used in unaffected areas.

An example of the display shown to the crew for the detection of an ash cloud is shown in FIG. 4. (The actual display uses multiple colours). This is based on an ash cloud composed of silicate material and shows the $DT1_{Ash}$ signal for 6 frames separated by a constant short time difference from two cameras imaging ahead of the aircraft. Highest concentrations of ash are indicated in red (dark in FIG. 4); the background sky is shown in light purple (or light grey in FIG. 3). As the aircraft approaches the hazard, the pilot can alter the heading of the aircraft to avoid it.

As discussed above, the threshold values used in the algorithm are pre-computed values stored in a look-up table in memory 4. They are obtained from a detailed radiative transfer model of the atmosphere utilizing geometrical considerations appropriate for viewing in the infrared region (6-13 μm) from an aircraft. The model uses a three dimensional 'monte carlo' approach that allows arbitrary viewing geometry and for the medium (i.e. the substances present in the atmosphere) to be specified flexibly. Thus, the presence of ash, ice-covered ash, mixtures, water clouds, water vapour, etc may all be specified.

The model also calculates an "environmental" temperature of each of the image pixels based on the ambient temperature sensed by the aircraft instruments. Versions of the model are created with and without a volcanic cloud. A comparison of the clear atmosphere model with one in which a volcanic cloud is simulated identifies the "signature" characteristics which occur only when a volcanic cloud is present. Suitable threshold values can then be determined.

The look-up table is a multi-dimensional array which is indexed using ambient temperature and aircraft altitude and attitude data so that a given, predetermined threshold value is provided for sets of the other parameters.

Figure 5:
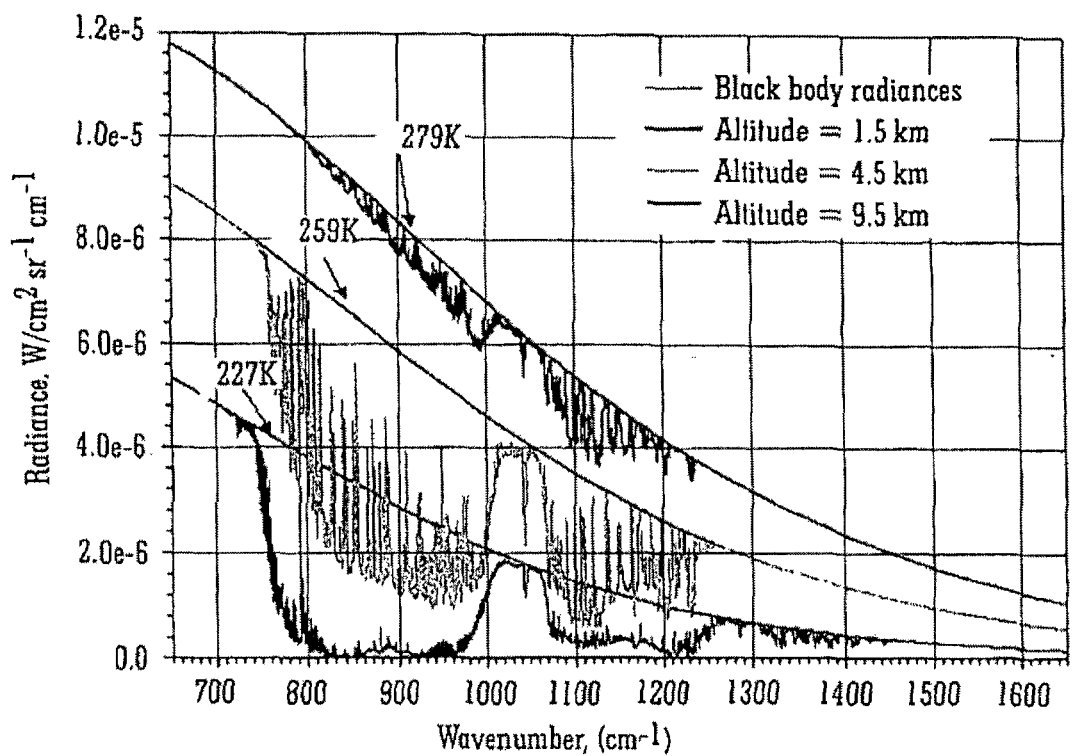
FIG. 5 shows a series of plots of infrared radiance against wave number for the horizontal path ahead of a cruising aircraft at three different altitudes in a clear atmosphere.

FIG. 5 shows a horizontal path simulation of the radiance of the clear atmosphere from 700-1600 $cm^{-1}$ at three different flight altitudes (the lowermost radiance curve is an altitude of 9.5 km, the middle is 4.5 km, and the uppermost is 1.5 km). At 9.5 km the atmosphere appears very cold—the equivalent blackbody temperature of the horizontal path is about 227 K. Notice that the radiance curves change with altitude and hence with ambient temperature as determined by the on board aircraft instrumentation and used by the detection algorithm. (It could equally use altitude instead of the temperature, but the temperature is a more robust measure). Any volcanic cloud placed between the aircraft and the cold background will alter the radiance received by the system in a known way. Thus the spectral content of the radiation then contains signatures of ash, $SO_2$, $H_2O$ and ice-coated ash particles. The threshold values obtained from the radiative transfer model are stored in the look-up table.

The ash signal in these spectra is characterised by a higher brightness temperature in filter 4 (BT4) than in filter 5 (BT5), when viewing a cold background. The threshold values are determined by using refractive index data for silicates and scattering calculations are based on measured particle size distribution for particles with radii in the range 1-20 µm, according to the art. Generally, the camera array 6 will look in the horizontal or slightly upwards (aircraft usually have a 3° pitch angle upwards). However, the aircraft may pitch downwards, in which case the background temperature might change from a cold background to a warm background. It is for this reason that the aircraft altitude must be considered when determining threshold values. In the cold background case, the ash signature is identified by BT4<BT5. In other words, the threshold will have the opposite sign to the pitch-up equivalent. The look-up table is therefore constructed in such a way that the pitch angle and ambient temperature are accounted for. Additionally, the roll and yaw angles are compensated for, although these have only a minor influence on the detection algorithm. Extra fail-safe thresholds are also incorporated into the detection algorithm by utilizing a filter near 8.6 µm that has sensitivity to volcanic ash.

The operation of the ice-coated ash algorithm is similar to the ash algorithm, except the threshold look-up table is now determined using data for ice (refractive indices and scattering data for small particles, radii<30 µm). In the case of small ice particles, BT4<BT5 for viewing into a cold background (the opposite to ash without an ice coating). Background conditions are accounted for in a similar way to that used for the ash detection.

Normalisation of the temperature differences is done to provide some robustness and to make the detection independent of the ambient air temperature.

Figure 6:
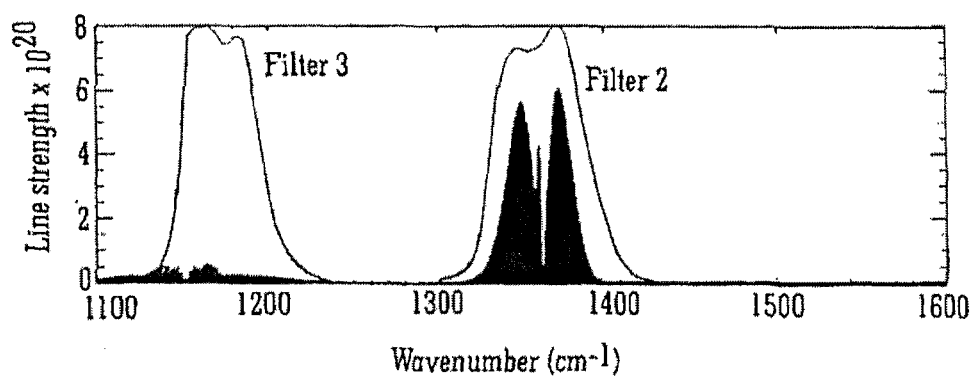
FIG. 6 shows a diagram of line strengths for the two bands of $SO_2$ at 8.6 μm and 7.3 μm. The response functions for the filters of the system are also shown.

$SO_2$ and $H_2O$ threshold look-up tables are also used. $SO_2$ has very strong absorptions near to 8.6 µm and 7.3 µm as FIG. 6 illustrates. The principle of detecting $SO_2$ has been described earlier and is based on radiative transfer calculations assuming the line strengths and transmissions applicable to the case of an atmosphere loaded with $SO_2$. Under normal conditions $SO_2$ has an extremely low abundance ($<10^{-3}$ ppm), and so detection of $SO_2$ using these absorptions features is very effective in the case of volcanic clouds ahead of an aircraft.

The invention claimed is:

1. A method of detecting an adverse condition in the atmosphere ahead of an aircraft in flight, comprising:
    a) utilizing an onboard computer model of the atmosphere based on a simulation of infrared radiative transfer characteristics of a clear atmosphere combined with infrared radiative transfer characteristics of the adverse condition, the computer model providing data corresponding to views from the aircraft at any altitude and taking into account its attitude, wherein the data derived from the model is stored in memory and said data is used in the determination of step (b);
    b) using an infrared sensor mounted on the aircraft to measure a value corresponding to the brightness temperature at a given frequency as viewed ahead of the aircraft;
    c) based on the aircraft's altitude and attitude sampled from the aircraft instrument data stream, using the on board computer model to determine by an onboard processor whether the brightness temperature value measured in step (b) is indicative of the atmosphere ahead of the aircraft having the adverse condition; and
    d) where the adverse condition is indicated in step (c), providing by the onboard processor an alert to the presence of the adverse condition, and wherein the aircraft conducts evasive action.

2. The method as claimed in claim 1, wherein the data is stored as a look-up table in the aircraft.

3. The method as claimed in claim 2, wherein the look-up table is indexed by aircraft altitude and attitude.

4. The method as claimed in claim 3, wherein the data comprises threshold values indicative of the presence of the adverse condition.

5. The method as claimed in claim 4, wherein an alert in the aircraft is provided if a function of the brightness temperature exceeds the threshold value obtained from the look-up table for the altitude and attitude of the aircraft and for the frequency at which the brightness temperature was determined.

6. The method as claimed in claim 5, wherein the function comprises a difference between the brightness temperature at a first frequency and a further brightness temperature at a second frequency.

7. A method of manufacturing an apparatus for the detection of an adverse condition ahead of an aircraft in flight, the method comprising:
    (i)—providing an electronic data processor on the aircraft including a microprocessor and memory;
    (ii)—utilizing an onboard computer model of the atmosphere based on a simulation of infrared radiative transfer characteristics of a clear atmosphere combined with infrared radiative transfer characteristics of the adverse condition, the computer model providing data corresponding to views from the aircraft at any altitude and taking into account its attitude;
    (iii)—storing data derived from the model in the memory;
    (iv)—linking the data processor data to the brightness temperature measured by an onboard infrared sensor, aircraft altitude and aircraft attitude sampled from the aircraft instrument data stream; and
    (v)—providing software capable of using the data from steps (iii) and (iv) to determine whether an adverse atmospheric condition exists ahead of an aircraft and providing an alert resulting in the aircraft conducting evasive action.

8. The method as claimed in claim 7, wherein the data derived from the model is stored onboard the aircraft in a look-up table.

9. The method as claimed in claim 8, wherein the data comprises threshold values indicative of the presence of the adverse condition.

10. The method as claimed in claim 8, wherein the alert is provided if a function of the brightness temperature exceeds the threshold value obtained from the look-up table for the altitude and attitude of the aircraft and for the frequency at which the brightness temperature was determined.

11. The method as claimed in claim 10, wherein the function comprises a difference between the brightness temperature at a first frequency and a further brightness temperature at a second frequency.

12. The method as claimed in claim 7, wherein a set of adverse atmospheric conditions is detected onboard the aircraft, the set including volcanic ash, ice coated ash, water vapour and/or sulphur dioxide.

13. The method as claimed in claim 12, wherein the identification of water vapour onboard the aircraft is used to confirm an identification of ice coated ash.

14. The method as claimed in claim 7, wherein brightness temperature is determined from detected infrared radiance onboard the aircraft.

15. The method as claimed in claim 7, comprising the use of one or more external blackened shutters on the aircraft against which the infrared sensors may be calibrated.

16. An apparatus on an aircraft comprising a detector array including at least one infrared sensor, a processing unit, and a display unit wherein the apparatus is configured to perform a method of detecting an adverse condition in the atmosphere ahead of the aircraft in flight, the method comprising:
　a) utilizing a computer model of the atmosphere on the aircraft based on a simulation of infrared radiative transfer characteristics of a clear atmosphere combined with infrared radiative transfer characteristics of the adverse condition, the computer model providing data corresponding to views from the aircraft at any altitude and taking into account its attitude, wherein the data derived from the model is stored in memory and said data is used in the determination of step (b);
　b) using the infrared sensor mounted on the aircraft to measure a value corresponding to the brightness temperature at a given frequency as viewed ahead of the aircraft;
　c) based on the aircraft's altitude and attitude sampled from the aircraft instrument data stream, using the model to determine by the processor whether the brightness temperature value measured in step (b) is indicative of the atmosphere ahead of the aircraft having the adverse condition; and
　d) where the adverse condition is indicated in step (c), providing by the processor an alert to the presence of the adverse condition on the display unit resulting in the aircraft conducting evasive action.

17. The apparatus as claimed in claim 16, wherein the data is stored as a look-up table.

18. The apparatus as claimed in claim 17, wherein the look-up table is indexed by aircraft altitude and attitude.

19. The apparatus as claimed in claim 18, wherein the data comprises threshold values indicative of the presence of the adverse condition.

20. The apparatus as claimed in claim 19, wherein an alert is provided if a function of the brightness temperature exceeds the threshold value obtained from the look-up table for the altitude and attitude of the aircraft and for the frequency at which the brightness temperature was determined.

21. The apparatus as claimed in claim 20, wherein the function comprises a difference between the brightness temperature at a first frequency and a further brightness temperature at a second frequency.

22. A non-transitory computer readable medium storing computer-executable instructions, which when executed by a processor on an aircraft cause the apparatus to perform a method of detecting an adverse condition in the atmosphere ahead of the aircraft in flight, comprising:
　a) utilizing a computer model of the atmosphere based on a simulation of infrared radiative transfer characteristics of a clear atmosphere combined with infrared radiative transfer characteristics of the adverse condition, the computer model providing data corresponding to views from the aircraft at any altitude and taking into account its attitude, wherein the data derived from the model is stored in memory and said data is used in the determination of step (b);
　b) using an infrared sensor mounted on the aircraft to measure a value corresponding to the brightness temperature at a given frequency as viewed ahead of the aircraft;
　c) based on the aircraft's altitude and attitude sampled from the aircraft instrument data stream, using the model to determine by the
　processor whether the brightness temperature value measured in step (b) is indicative of
　the atmosphere ahead of the aircraft having the adverse condition; and
　d) where the adverse condition is indicated in step (c), providing by the processor an alert to the presence of the adverse condition resulting in the aircraft conducting evasive action.

23. The non-transitory medium as claimed in claim 22, wherein the data is stored as a look-up table.

24. The non-transitory medium as claimed in claim 23, wherein the look-up table is indexed by aircraft altitude and attitude.

25. The non-transitory medium as claimed in claim 24, wherein the data comprises threshold values indicative of the presence of the adverse condition.

26. The non-transitory medium as claimed in claim 25, wherein an alert is provided if a function of the brightness temperature exceeds the threshold value obtained from the look-up table for the altitude and attitude of the aircraft and for the frequency at which the brightness temperature was determined.

27. The non-transitory medium as claimed in claim 26, wherein the function comprises a difference between the brightness temperature at a first frequency and a further brightness temperature at a second frequency.

\* \* \* \* \*